March 30, 1954  R. G. TETRO  2,673,939
DRIVE-CONTROL FOR SYNCHRONOUS MOTORS
Filed June 10, 1952
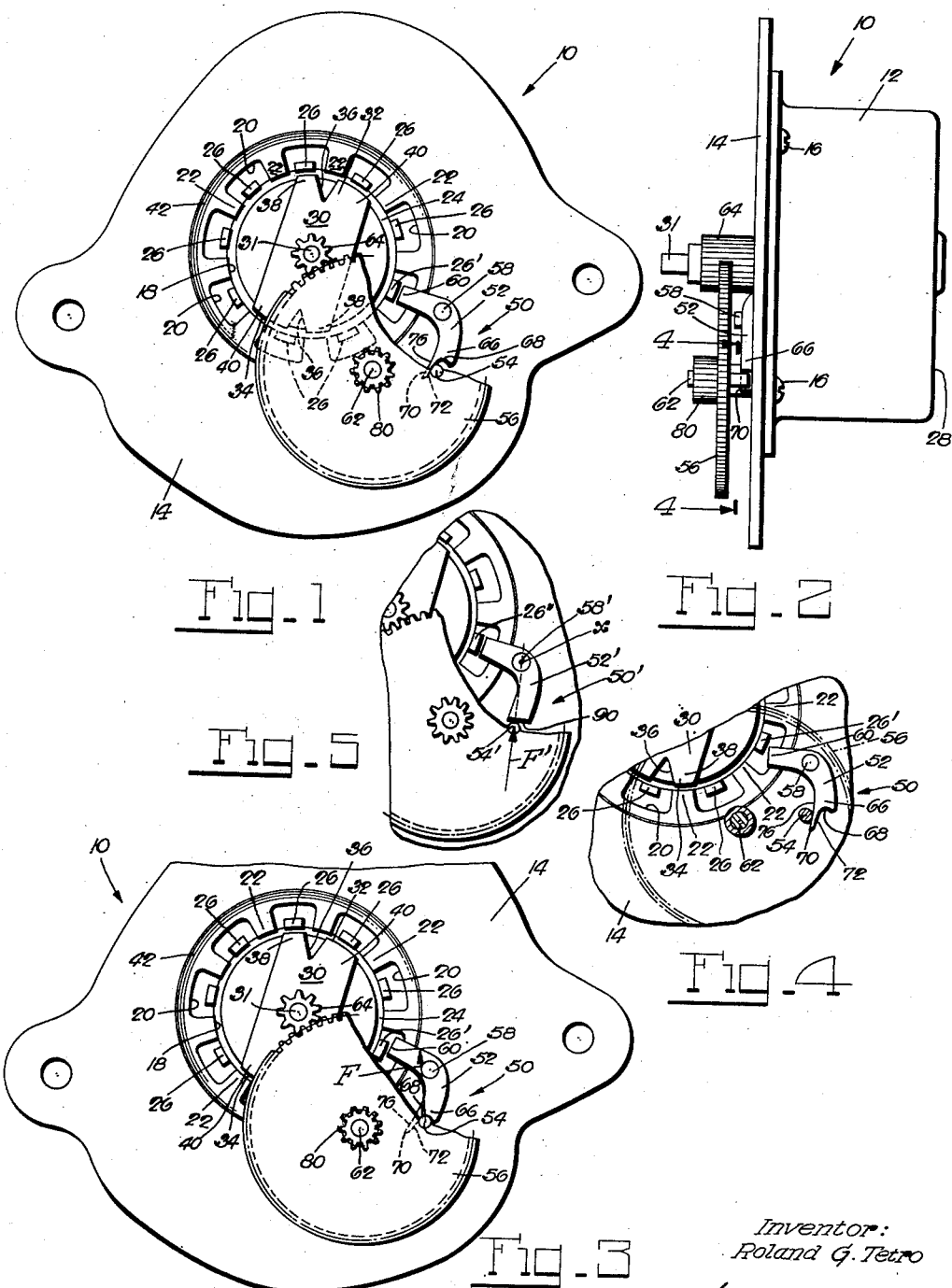
Inventor:
Roland G. Tetro
by Stewart & Sprigel
Attorneys.

Patented Mar. 30, 1954

2,673,939

UNITED STATES PATENT OFFICE 2,673,939

DRIVE-CONTROL FOR SYNCHRONOUS MOTORS

Roland G. Tetro, Bristol, Conn., assignor to The E. Ingraham Company, Bristol, Conn., a corporation of Connecticut Application June 10, 1952, Serial No. 292,649

11 Claims. (Cl. 310—41)

This invention relates generally to alternating current motors of the synchronous type, and more particularly to uni-directional drive motors of this type.

It is an object of the present invention to have on a synchronous motor of non-controlled starting direction a control for immediately reversing the drive of the motor whenever the same happens to start in a direction opposite to a predetermined uni-directional drive thereof.

It is another object of the present invention to have the aforementioned drive-control provided on synchronous motors of the self-starting type, so that the same may be used especially, though not exclusively, as prime movers for timing devices in general, and timepieces in particular.

A further object of the present invention is to provide a drive-control of this type which is exceedingly simple in construction, yet highly reliable in its performance, and which readily lends itself to efficient mass production at low cost and quick and easy assembly with synchronous motors.

It is still another object of the present invention to have the aforemetnioned drive-control in the form of a pivoted pawl-like element and a cooperating stop on a driven element of the motor, of which the pawl element is magnetically coupled to one of the field poles of the motor so as yieldingly to be held in the path of the stop to obstruct the same and thereby reverse the drive of the motor when the same starts in the wrong direction, or to be periodically cammed harmlessly out of the way by the stop when the motor runs in the right direction.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a bottom view of a synchronous motor having a drive-control embodying the present invention;

Fig. 2 is a side view of the same motor with its drive-control;

Fig. 3 is a view of the motor similar to Fig. 1, and showing certain parts of its drive-control in a different operating position;

Fig. 4 is a fragmentary section taken substantially on the same line 4—4 of Fig. 2, and showing parts of the drive-control in still another operating position; and Fig. 5 is a fragmentary bottom view of a synchronous motor having a modified drive-control.

Referring to the drawings, and more particularly to Figs. 1 to 3 thereof, the reference numeral 10 designates a synchronous alternating current motor having a cup-shaped casing 12 and a bottom plate 14 which is secured to the casing by screws 16, for instance (Fig. 2). The casing 12 and bottom plate 14 are of non-permanent magnetic material and form part of the field of the motor. The bottom plate 14 is provided with a circular aperture 18 and a plurality of cutouts 20 to define one set of spaced field poles 22. Suitably mounted in the casing 12 is a fixed field plate or disc 24 having laterally bent tongues 26 which form another set of field poles arranged in alternation with the field poles 22 as shown. A field coil (not shown) is suitably mounted in the casing 12 between the end 28 thereof and the plate 24 therein, so that an alternating current passing through the field coil will set up periodically alternating, instantaneous opposite polarities in the field poles 22 and 26, respectively.

The instant motor further comprises a rotor 30 on a shaft 31 which is suitably journalled in the field casing 12. The rotor 30 may be of the permanent magnetic type or of the non-permanent magnetic type. In the present example, the rotor is of the permanent magnetic type and has opposite poles 32 and 34 of opposite polarities. Each of the rotor poles 32 and 34 is provided with an off-center notch 36 to divide it into pole sections 38 and 40. In thus notching the poles of the rotor 30, the motor becomes self-starting, as is fully shown and described in the copending application of Walter Kohlhagen, Serial No. 290,460, filed May 28, 1952. Since the self-starting feature of this motor forms no part of the present invention, it need merely be explained that the rotor 30 will, on energization of the field coil, start in either direction, depending on the last stop position of the rotor and the initial polarities of the field poles 22 and 26.

The rotor 30 and operatively associated field poles 26 are, in the present instance, spaced slightly inwardly from the outer face of the bottom plate 14. In order to bring the field poles 22 also into operative association with the rotor 30, the same as the field poles 26, an annular portion of the bottom plate 14 which surrounds the field poles 22 is slightly bent inwardly toward the casing 12 as at 42. The motor described so far may, except for its beforementioned self-starting feature, be considered to be conventional in every respect, and forms no part of the present invention.

In accordance with the present invention, there is provided on the motor a drive-control 50 which comprises a pawl-like element or lever 52 and a stop element or pin 54 on a motor-driven part 56. The pawl element 52, which is of non-permanent magnetic material, is pivotally mounted intermediate its ends on the outer face of the bottom plate 14 as at 58, and has one end 60 thereof magnetically coupled to any one of the field poles 22 or 26, in this instance the field pole 26' (Fig. 1), when the field coil of the motor is energized. The motor-driven part 56, which carries the stop pin 54, is in this instance a rotary gear on a shaft 62 which is carried by the bottom plate 14 of the motor. The gear 56 is in mesh with a pinion 64 on the rotor shaft 31, so that the gear 56 is driven from the rotor 30, in this instance at reduced speed. The other end 66 of the pawl element 52 is provided with a shoulder 68 and a projecting tail 70 at one side of the shoulder 68. The shoulder 68 is, in the present instance, in the form of a depression.

Assuming that the motor has just been started and runs in the wrong direction, i. e., a direction in which the gear 56 is driven counterclockwise as viewed in Fig. 1, the stop pin 54 on the gear 56 will soon engage the cam-like flank 72 of the tail 70 on the pawl element 52 in the normal position of the latter shown in Fig. 1 in which the same is then magnetically held by the adjacent field pole 26'. On continued rotation of the gear 56 in counterclockwise direction (Fig. 1) the stop pin 54 will cooperate with the adjacent flank 72 of the tail 70 in turning the pawl element 52 from its maximum magnetically coupled relation with the field pole 26' (Fig. 1) until the stop pin 54 moves into engagement with the shoulder 68 on the pawl element (Fig. 3). Further counterclockwise rotation of the gear 56 is now effectively stopped by the pawl element 52, and the next change in polarities of the field poles 22 and 26 to the signs which will induce reverse rotation of the rotor 30, will power-start the rotor in the reverse or right direction regardless of whether or not the stop pin 54 has been slightly repelled from the pawl element 52 when moving into engagement with the shoulder 68 thereon. Simultaneously with the reversal of the rotor 30 to its correct driving direction, the gear 56 will be driven clockwise as viewed in Fig. 3, with the result that the stop pin 54 will move away from the pawl element 52 and the latter will be returned from the position shown in Fig. 3 to that shown in Fig. 1 in which it is in maximum magnetically coupled relation with the field pole 26'. The stop pin 54 will thereafter during each successive clockwise revolution of the gear 56 engage the other flank 76 of the tail 70 on the pawl element 52 and momentarily cam the latter harmlessly out of the way (Fig. 4). Immediately after each passage of the stop pin 54, the pawl element 52 will be returned to its normal position of maximum magnetic coupling with the field pole 26' (Fig. 1), as will be readily understood. Thus, the pawl element 52 will almost immediately reverse the drive of the motor if started in the wrong direction, and will periodically be cammed harmlessly out of the way by the stop pin 54 when the motor runs in the right direction.

The drive-controlled motor, whether self-starting or not self-starting, includes not only the pawl element 52 and the stop pin 54, but also the rotor-driven part 56. The motor 10, being in the present instance of the self-starting type as mentioned, is useful especially, though not exclusively, as the prime mover of a timing device in general, and a timepiece in particular. Thus, the pinion 64 and gear 56 may form part of the gear train of a movement, and turning with the gear 56 may be a smaller gear 80 for driving connection with another gear of the train.

While the stop pin 54 is in the instant example carried by a gear which is driven by a pinion on the rotor shaft of the motor, it is fully within the scope of the present invention to provide the stop pin on a part which is carried by and turns directly with the rotor shaft of the motor, or to provide the stop pin on any gear of a gear train from the rotor shaft. In either case, the correct coordination of the pawl element with the stop pin is self-evident. The instant exemplary provision of the stop pin on the first large gear which is in mesh with the pinion on the rotor shaft is, however, advantageous for the use of the motor as the prime mover of the movement of a timepiece, in that the stop pin is carried by a gear which is part of the usual reduction gear train of the movement and which has sufficient angular speed to bring about almost immediate reversal of the drive of the motor whenever the same starts in the wrong direction. Also, while the pawl element is, in the present instance, held in its normal obstructing position (Fig. 1) by its magnetic coupling with one of the field poles, the pawl element could also be normally held in the same obstructing position by a spring (not shown), in which case the pawl element need not be magnetically coupled to one of the field poles, as will be readily understood.

The tail 70 of the pawl element 52 is relatively slender and the opposite flanks 72 and 76 thereof serve to cam the pawl element in opposite directions from its normal position as described (Figs. 3 and 4). In causing the stop pin 54 to cam the pawl element 52 out of its position of maximum magnetic coupling with the field pole 26' when the gear 56 turns in the wrong direction, i. e., counterclockwise as viewed in Figs. 1 and 3, the pawl element will have a brake effect on the stop pin and the impact of the latter with the stop shoulder 68 on the pawl element will be accordingly reduced. Further, by normally holding the stop shoulder 68 on the pawl element 52 out of direct alignment with the stop pin 54 on the gear 56 when the latter turns in the wrong direction (Fig. 1) so that angular displacement of the pawl element in one direction is required in order to bring the stop shoulder 68 into alignment with the stop pin 54 (Fig. 3), the angular displacement of the pawl element in the opposite direction by the stop pin 54 during normal running of the motor in the right direction is kept at a minimum (Fig. 4), with the result that the end 60 of the pawl element 52 remains in either of its displaced positions strongly attracted to the field pole 26'.

As shown in Fig. 3, the pawl element 52 is preferably so arranged that its pivot mounting 58 is at least in fairly close proximity to the vector F of the impact force between the stop pin 54 on the gear 56 and the stop shoulder 68 on the pawl element, so that this impact force will in any event fail to set up in the pawl element a couple of sufficient force to overcome the magnetic force with which the pawl element is attracted to the field pole 26'. However, since the stop shoulder 68 on the pawl element is in the form of a depression which acts like a fork that straddles the stop pin 54 (Fig. 3), the pawl element then acts as a link which connects the stop pin 54 with the fixed plate 14 on the motor and positively prevents any further rotation of the stop pin in counterclockwise direction (Fig. 3).

Reference is now had to Fig. 5 which shows a modified drive-control 50'. Thus, the pawl element 52', which in this instance is also magnetically coupled to a field pole 26'', may have a flat end or stop surface 90, and the pawl element 52' may be so arranged that the vector F' of the impact force of stop pin 54' against the end surface 90 of the pawl element 52' will pass directly through the pivot axis $x$ of the latter. Further, the end surface 90 of the pawl element 52' may extend at right angles to the vector F'. Under these conditions, the impact of the stop pin with the pawl element will set up no couple whatsoever in the latter.

The instant drive-control is extremely simple in construction, yet highly reliable in operation, and may quickly be assembled with a synchronous motor. Accordingly, the instant drive-control contributes greatly to the efficient mass production of drive-controlled motors at low cost.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A drive control for a synchronous motor having a stator including field poles, and a magnetic rotor driven in either direction depending on the momentary opposite polarization of alternate field poles at the start of each power drive of the rotor, said control comprising a rotary element driven by the rotor and having a projection; and a member of non-permanent magnetic material mounted on a fixed pivot, said member having a stop surface and a cam surface and being magnetically coupled to a field pole to be yieldingly held in a normal position in which said stop surface is in obstructing relation with said projection when said element is driven in one direction, and said projection engages said cam surface and turns said member out of the way once during each revolution of said element in the opposite direction.

2. A drive control for a synchronous motor having a stator including field poles, and a magnetic rotor driven in either direction depending on the momentary opposite polarization of alternate field poles at the start of each power drive of the rotor, said control comprising a rotary element driven by the rotor and having a projection; and a lever of non-permanent magnetic material pivotally mounted on the stator, said lever having an end surface and a side surface and being yieldingly held in a normal position by being magnetically coupled to a field pole, the pivot axis of said lever being so located remote from said end surface thereof that the latter will, in said normal lever position, confront and be in the path of, and react with the pivot mounting of said lever in stopping, said projection when said element is driven in one direction, and said projection engages said side surface of the lever and cams the latter out of the way once during each revolution of said element in the opposite direction.

3. A drive control for a synchronous motor having a stator including field poles, and a magnetic rotor driven in either direction depending on the momentary opposite polarization of alternate field poles at the start of each power drive of the rotor, said control comprising a rotary element driven by the rotor and having a projection; and a lever of non-permanent magnetic material pivotally mounted on the stator and having a fork end and a side surface and being yieldingly held in a normal position by being magnetically coupled to a field pole, the pivot axis of said lever being so located remote from said fork end thereof that the latter will, in said normal lever position, confront and be in the path of, and react with the pivot mounting of said lever in stopping, said projection when said element is driven in one direction, and said projection engages said side surface of the lever and cams the latter out of the way once during each revolution of said element in the opposite direction.

4. A drive control for a synchronous motor having a stator including field poles, and a magnetic rotor driven in either direction depending on the momentary opposite polarization of alternate field poles at the start of each power drive of the rotor, said control comprising a rotary element driven by the rotor and having a projection; and a lever of non-permanent magnetic material having an end surface and a side surface and being pivotally mounted on the stator remote from said end surface, said lever being magnetically coupled to a field pole to assume a normal position in which said end surface thereof confronts and is in the path of said projection when said element is driven in one direction, and said lever and projection being so coordinated that the vector of the impact force between said projection and said end surface of the lever in its normal position passes substantially through the pivot mounting of said lever, and said projection engages said side surface of the lever and cams the latter out of the way once during each revolution of said element in the opposite direction.

5. A drive control for a synchronous motor as set forth in claim 4, in which said end surface of the lever extends in said normal position of the latter substantially at right angles to said vector.

6. A drive control for a synchronous motor as set forth in claim 4, in which said end surface of the lever is in the shape of a depression into which said projection moves and which fork-like straddles the latter when said element is driven in said one direction.

7. A drive control for a synchronous motor as set forth in claim 4, in which said rotary element is a gear on the stator, and there is further provided a pinion carried by said rotor and in mesh with said gear.

8. A drive control for a synchronous motor having a stator including field poles, and a magnetic rotor driven in either direction depending on the momentary opposite polarization of alternate field poles at the start of each power drive of the rotor, said control comprising a rotary element driven by the rotor and having a projection; and a lever of non-permanent magnetic material having opposite sides and an end provided with a stop shoulder and a longitudinal tail extension having opposite first and second flanks continuous with one lever side and leading to said stop shoulder, respectively, said lever being pivotally mounted on the stator remote from said end thereof, and being magnetically coupled to a field pole to assume a normal position in which said second flank of the tail extension is in the path of said projection and is engaged thereby to cam said lever from its normal position in a first direction to bring said stop shoulder into obstructing relation with said projection when said element is driven in one direction, and said projection engages said first flank of the tail extension on said lever and cams the latter out of the way from said normal position in a direction opposite to said first direction once during each revolution of said element in the opposite direction.

9. A drive control for a synchronous motor as set forth in claim 8, in which said lever and projection are so coordinated that the vector of the impact force between said projection and said stop shoulder of the lever passes substantially through the pivot mounting of said lever.

10. A drive control for a synchronous motor as set forth in claim 8, in which said stop shoulder is concave and fork-like straddles said projection when said element is driven in said one direction.

11. A drive control for an electric time mechanism having a synchronous motor with a stator, including field poles, and a magnetic rotor, and a train of gears including a pinion on the rotor, said control comprising a projection on one of the gears of said train; and a pivotally mounted member of non-permanent magnetic material on the stator, said member having a stop surface and a cam surface and being magnetically coupled to a field pole to assume a normal position in which its stop surface is in obstructing relation with said projection on said one gear when the latter is driven in one direction, and said projection engages said cam surface and turns said member out of the way once during each revolution of said one gear in the opposite direction.

ROLAND G. TETRO.

References Cited in the file of this patent

FOREIGN PATENTS

| Number | Country | Date |
|---|---|---|
| 493,654 | Great Britain | Oct. 12, 1938 |
| 603,480 | Great Britain | June 16, 1940 |